United States Patent
Grossmann et al.

(10) Patent No.: US 12,308,918 B2
(45) Date of Patent: May 20, 2025

(54) CSI REPORTING BASED ON LINEAR COMBINATION CODEBOOK

(71) Applicant: Fraunhofer-Gesellschaft zur Förderung der angewandten Forschung e.V., Munich (DE)

(72) Inventors: Marcus Grossmann, Erlangen (DE); Venkatesh Ramireddy, Erlangen (DE)

(73) Assignee: Fraunhofer-Gesellschaft zur Förderung der angewandten Forschung e.V. (DE)

(*) Notice: Subject to any disclaimer, the term of this patent is extended or adjusted under 35 U.S.C. 154(b) by 0 days.

(21) Appl. No.: 18/038,268

(22) PCT Filed: Nov. 23, 2021

(86) PCT No.: PCT/EP2021/082709
§ 371 (c)(1),
(2) Date: May 23, 2023

(87) PCT Pub. No.: WO2022/106730
PCT Pub. Date: May 27, 2022

(65) Prior Publication Data
US 2023/0421220 A1 Dec. 28, 2023

(30) Foreign Application Priority Data
Nov. 23, 2020 (EP) .................................. 20209350

(51) Int. Cl.
*H04B 7/06* (2006.01)
*H04B 7/0456* (2017.01)
*H04W 24/10* (2009.01)

(52) U.S. Cl.
CPC ......... *H04B 7/0626* (2013.01); *H04B 7/0456* (2013.01); *H04W 24/10* (2013.01)

(58) Field of Classification Search
CPC .. H04B 7/0626; H04B 7/0456; H04B 7/0486; H04B 7/0478; H04W 24/10
(Continued)

(56) References Cited

U.S. PATENT DOCUMENTS 11,637,732 B2 * 4/2023 Rahman .............. H04L 27/2634
370/329
2020/0322012 A1 * 10/2020 Wernersson ......... H04B 7/0478
(Continued)

FOREIGN PATENT DOCUMENTS

WO    WO 2020/221581 A1    5/2020

OTHER PUBLICATIONS

Search Report and Written Opinion of the International Searching Authority, or the Declaration, Mar. 18, 2022, International Application No. PCT/EP2021/082709, European Patent Office.
(Continued)

*Primary Examiner* — Emmanuel Bayard
(74) *Attorney, Agent, or Firm* — Burr & Forman LLP; Nathaniel T. Quirk, Esq.

(57) ABSTRACT

A method performed by a UE for generating a CSI report in a wireless communication system, including receiving from a network node, a CSI report configuration information including at least one parameter, D, for indicating a first basis set of D basis vectors used for constructing for each transmission layer a precoding vector or matrix for a rank set; identifying a precoding vector matrix for each transmission layer based on the first basis set, a second basis set comprising P basis vectors, and a number of combining coefficients for combining selected vectors from the first and second basis sets; generating a CSI report based on the CSI report configuration information for a RI, or v of the rank set; and transmitting the CSI report to the network node.

16 Claims, 4 Drawing Sheets

(58) Field of Classification Search
USPC .................................................. 375/267, 299
See application file for complete search history.

(56) References Cited

U.S. PATENT DOCUMENTS

| | | | |
|---|---|---|---|
| 2021/0126691 A1* | 4/2021 | Tosato ................. | H04B 7/0478 |
| 2023/0145057 A1* | 5/2023 | Zhang .................. | H04L 5/0051 |
| | | | 370/329 |
| 2023/0208482 A1* | 6/2023 | Rahman ............... | H04B 7/0482 |
| | | | 370/329 |

OTHER PUBLICATIONS

3GPP TSG RAN WG1 Ad-Hoc Meeting 1901, Taipei, Jan. 21-25, 2019—R1900338 , Discussions on Type II CSI Enhancement.

* cited by examiner

CSI REPORTING BASED ON LINEAR COMBINATION CODEBOOK

CROSS-REFERENCE TO RELATED APPLICATION

This application is a national stage application, filed under 35 U.S.C. § 371, of International Patent Application No. PCT/EP2021/082709 filed on Nov. 23, 2021, and European Patent Application EP20209350.6 filed on Nov. 23, 2020, which are incorporated by reference herein in their entirety.

FIELD OF THE INVENTION

The present application concerns the field of wireless communications, more specifically to feedback reporting for a codebook-based precoding in a wireless communication system. Embodiments related to channel status information, CSI, reporting based on linear combination port-selection codebook.

BACKGROUND OF THE INVENTION

FIG. 1 is a schematic representation of a terrestrial wireless network 100 including, as is shown 20 in FIG. 1(a), a core network 102 and one or more radio access network(s) 104. FIG. 1(b) is a schematic representation of a radio access network 104 that may include one or more base stations gNB, to gNBs, each serving a specific area surrounding the base station schematically represented by respective cells $106_1$ to $106_5$.

The base stations are provided to serve users within a cell. The term base station, BS, refers to a gNB in 5G networks, eNB in UMTS/LTE/LTE-A/LTE-A Pro, or just BS in other mobile communication standards. A user may be a stationary device or a mobile device which connects to a base station or to a user. The mobile device may include a physical device, like a user equipment, UE; or a IoT device, a ground based vehicle, such as a robot or a car, an aerial vehicle, such as a manned or unmanned aerial vehicle (UAV), the latter also referred to as drone, a building or any other item or device having embedded network connectivity that enables collecting or exchanging data across an existing network infrastructure, like a device including certain electronics, software, sensors, actuators, or the like. FIG. 1 shows only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to gNBs may connected, e.g. via the S1 or X2 interface or XN interface in NR, with each other via respective backhaul links $116_1$ to $116_5$, which are schematically represented in FIG. 1 by the arrows pointing to "gNBs".

For data transmission a physical resource grid may be used. The physical resource grid may comprise a set of resource elements to which various physical channels and physical signals are mapped. For example, the physical channels may include the physical downlink (DL), uplink (UL) and/or sidelink, (SL), shared channels (PDSCH, PUSCH, PSSCH) carrying user specific data, also referred to as downlink, uplink or sidelink payload data, the physical broadcast channel (PBCH) carrying for example a master information block (MIB) and a system information block (SIB), the physical downlink, uplink and/or sidelink control channels (PDCCH, PUCCH, PSCCH) carrying for example the downlink control information (DCI), the uplink control information (UCI) or the sidelink control information (SCI). For the uplink, the physical channels may further include the physical random access channel (PRACH or RACH) used by UEs for accessing the network once a UE is synchronized and obtains the MIB and SIB. The physical signals may comprise reference signals or symbols (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also include or consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having two distinct overlaid networks, a network of macro cells with each macro cell including a macro base station, like base station gNB, to gNB 5, and a network of small cell base stations (not shown in FIG. 1), like femto- or pico-base stations. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a wireless communication system like the one depicted schematically in FIG. 1, multi-antenna techniques may be used, e.g., in accordance with LTE, NR or any other communication system, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct or focus a data transmission towards an intended receiver. The precoder matrix to be used at the gNB to map the data to the transmit antenna ports is decided using channel state information, CSI.

In a wireless communication system as described above, such as LTE or New Radio (5G), downlink signals convey data signals, control signals containing downlink, DL, control information (DCI), and a number of reference signals or symbols (RS) used for different purposes. A gNodeB (or gNB or base station) transmits data and downlink control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of reference signals (RSs) including a common RS (CRS) in LTE, a channel state information RS (CSI-RS), a demodulation RS (DM-RS), and a phase tracking RS (PT-RS). The CRS is transmitted over a DL system bandwidth part and used at the user equipment (UE) to obtain a channel estimate to demodulate the data or control information. The CSI-RS is transmitted with a reduced density in the time and frequency domain compared to CRS and used at the UE for channel estimation or for channel state information (CSI) acquisition. The DM-RS is transmitted only in a bandwidth part of the respective PDSCH and used by the UE for data demodulation. For signal precoding at the gNB, several CSI-RS reporting mechanisms are used such as non-precoded CSI-RS and beamformed CSI-RS reporting. For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam direction and beam width. For beamformed/precoded UE-specific or non-UE-specific CSI-RS, a beamforming operation is applied over a single antenna port or over multiple antenna ports to have several narrow beams with high gain in different directions and, therefore, no cell-wide coverage.

In a wireless communication system employing time division duplexing, TDD, due to channel reciprocity, the channel state information (CSI) is available at the base station (gNB). However, when employing frequency division duplexing, FDD, due to the absence of channel reciprocity, the channel is estimated at the UE and the estimate is fed back to the gNB. FIG. 2 shows a block-based model of a MIMO DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array ANTT having a plurality of antennas or antenna elements, and a precoder 206 receiving a data vector 208 and a precoder matrix F from a codebook 210. The channel 204 may be described by the channel tensor/matrix 212. The user equipment 202 receives the data vector 214 via an antenna or an antenna array ANTR having a plurality of antennas or antenna elements. A feedback channel 216 between the user equipment 202 and the base station 200 is provided for transmitting feedback information. The previous releases of 3GPP up to Rel.15 support the use of several downlink reference symbols (such as CSI-RS) for CSI estimation at the UE.

In FDD systems (up to Rel. 15), the estimated channel at the UE is reported to the gNB implicitly where the CSI report transmitted by the UE over the feedback channel includes the rank index (RI), the precoding matrix index (PMI) and the channel quality index (CQI) (and the CRI from Rel. 13) allowing, at the gNB, to decide the precoding matrix, and the modulation order and coding scheme (MCS) of the symbols to be transmitted. The PMI and the RI are used to determine the precoding matrix from a predefined set of matrices $\Omega$ also referred to as codebook. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for gNBs equipped with one-dimensional Uniform Linear Arrays (ULAs) having $N_1$ dual-polarized antennas (in total $N_t=2N_1$ antennas), or with two-dimensional Uniform Planar Arrays (UPAs) having dual-polarized antennas at $N_1 N_2$ positions (in total $N_t=2N_1 N_2$ antennas). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beamforming weights (also referred to as the array steering vectors) of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to read the codebook and obtain the precoder. The array steering vectors may be described by the columns of a 2D Discrete Fourier Transform (DFT) matrix when ULAs or UPAs are used for signal transmission.

The precoder matrices used in the Type-I and Type-II CSI reporting schemes in 3GPP New Radio Rel. 15 are defined in the frequency-domain and have a dual-stage structure (i.e., two components codebook): $F(s)=F_1 F_2 (s)$, $s=0, \ldots, S-1$, where S denotes the number of subbands. The first component or the so-called first stage precoder, $F_1$, is used to select a number of beam vectors and rotation oversampling factors from a Discrete Fourier Transform-based (DFT-based) matrix, which is also called the spatial codebook. Moreover, the first stage precoder, $F_1$, corresponds to a wide-band matrix, independent of the subband index s, and contains L spatial beamforming vectors (the so-called spatial beams) $b_l \in \mathbb{C}^{N_1 N_2 \times 1}$, $l=0, \ldots, L-1$ selected from a DFT-based codebook matrix for the two polarizations of the antenna array, $$F_1 = \begin{bmatrix} b_0, \ldots, b_{L-1} & 0 \ldots 0 \\ 0 \ldots 0 & b_0, \ldots, b_{L-1} \end{bmatrix} \in \mathbb{C}^{2N_1 N_2 \times 2L}.$$

The first component or the so-called first stage precoder, $F_1$, is used to select a number of spatial domain (SD) or beam vectors and the rotation oversampling factors from a Discrete Fourier Transform-based (DFT-based) matrix which is also called the spatial codebook. The spatial codebook comprises an oversampled DFT matrix of dimension $N_1N_2 \times N_1O_1N_2O_2$, where $O_1$ and $O_2$ denote the oversampling factors with respect to the first and second dimension of the codebook, respectively. The DFT vectors in the codebook are grouped into $(q_1,q_2)$, $0 \leq q_1 \leq O_1-1$, $0 \leq q_2 \leq O_2-1$ subgroups, where each subgroup contains $N_1N_2$ DFT vectors, and the parameters $q_1$ and $q_2$ are denoted as the rotation oversampling factors, with respect to the first and second dimension of the antenna array, respectively.

The second component or the so-called second stage precoder, $F_2(s)$, is used to combine the selected beam vectors. This means the second stage precoder, $F_2(s)$, corresponds to a selection/combining/co-phasing matrix to select/combine/co-phase the beams defined in $F_1$ for the s-th configured sub-band. For example, for a rank-1 transmission and Type-I CSI reporting, $F_2(s)$ is given for a dual-polarized antenna array by $$F_2(s) = \begin{bmatrix} e_u \\ e^{j\delta_1} e_u \end{bmatrix} \in \mathbb{C}^{2L \times 1},$$

where $e_u \in \mathbb{C}^{L \times 1}$ contains zeros at all positions, except the u-th position which is one. Such a definition of $e_u$ selects the u-th vector in $F_1$ per polarization of the antenna. Furthermore, $e^{j\delta_1}$ is a quantized phase adjustment for the second polarization of the antenna array. For example, for a rank-1 transmission and Type-II CSI reporting, $F_2(s)$ is given for dual-polarized antenna arrays by $$F_2(s) = \begin{bmatrix} e^{j\delta_0} p_0 \\ \vdots \\ e^{j\delta_{2L-1}} p_{2L-1} \end{bmatrix} \in \mathbb{C}^{2L \times 1}$$

where $p_l$ and $e^{j\delta_l}$, l=0, 2, ..., 2L−1 are quantized amplitude and phase beam-combining coefficients, respectively. For rank-R transmission, $F_2(s)$ contains R vectors, wherein R denotes the transmission rank, where the entries of each vector are chosen to combine single or multiple beams within each polarization.

The selection of the matrices $F_1$ and $F_2(s)$ is performed by the UE based on reference signals such as CSI-RS and the knowledge of the channel conditions. The selected matrices are indicated in a CSI report in the form of a RI (the RI denotes the rank of the precoding matrices) and a PMI, and are used at the gNB to update the multi-user precoder for the next transmission time interval.

For the 3GPP Rel.-15 dual-stage Type-II CSI reporting, the second stage precoder, $F_2(s)$, is calculated on a subband basis such that the number of columns of F 2=[$F_2^{(r)}(0)$ ... $F_2^{(r)}(s)$ ... $F_2^{(r)}(S-1)$] for the r-th transmission layer depends on the number of configured CQI subbands S. Here, a subband refers to a group of adjacent physical resource blocks (PRBs). A drawback of the Type-II CSI feedback is the large feedback overhead for reporting the combining coefficients on a subband basis. The feedback overhead increases approximately linearly with the number of subbands and becomes considerably large for large numbers of subbands. To overcome the high feedback overhead of the Rel.-15 Type-II CSI reporting scheme, it has been decided in 3GPP RAN #81 to study feedback compression schemes for the second stage precoder $F_2$. In several contributions, it has been demonstrated that the number of beam-combining coefficients in $F_2$ may be drastically reduced when transforming $F_2$ using a small set of DFT-based basis vectors into the transform domain referred to as the delay domain. The corresponding three-stage precoder relies on a three-stage (i.e., three components) $F_1 F_2^{(r)} F_3^{(r)}$ codebook. The first component, represented by the matrix $F_1$, is identical to the Rel.-15 NR component, is independent off the transmission layer (r), and contains a number of spatial domain (SD) basis vectors selected from the spatial codebook. The second component, represented by the matrix $F_3^{(r)}$, is layer-dependent and is used to select a number of delay domain (DD) basis vectors from a Discrete Fourier Transform-based (DFT-based) matrix which is also called the delay codebook. The third component, represented by the matrix $F_2^{(r)}$, contains a number of combining coefficients that are used to combine the selected SD basis vectors and DD basis vectors from the spatial and delay codebooks, respectively.

Assuming a rank-R transmission the three-component precoder matrix or CSI matrix for a configured $2N_1N_2$ antenna/CSI-RS ports and configured S subbands is represented for a first polarization of the antenna ports and r-th transmission layer as $$F^{(r,1)} = \alpha^{(r)} \sum_{l=0}^{L-1} b_l \sum_{d=0}^{D-1} \gamma_{1,l,d}^{(r)} d_d^{(r)}$$

and for a second polarization of the antenna ports and r-th transmission layer as $$F^{(r,2)} = \alpha^{(r)} \sum_{l=0}^{L-1} b_l \sum_{d=0}^{D-1} \gamma_{2,l,d}^{(r)} d_d^{(r)},$$

where $b_u$ (l=0, ..., L−1) represents the u-th SD basis vector selected from the spatial codebook, $d_d^{(r)}$ (d=0, ..., D−1) is the d-th DD basis vector associated with the r-th layer selected from the delay codebook, $\gamma_{p,l,d}^{(r)}$ is the complex delay-domain combining coefficient associated with the u-th SD basis vector, the d-th DD basis vector and the p-th polarization, D represents the number of configured DD basis vectors, and $\alpha^{(r)}$ is a normalizing scalar.

An advantage of the three-component CSI reporting scheme in the above equations is that the feedback overhead for reporting the combining coefficient of the precoder matrix or CSI matrix is no longer dependent on the number of configured CQI subbands (i.e., it is independent from the system bandwidth). Therefore, the above three-component codebook has been recently adopted for the 3GPP Rel.-16 dual-stage Type-II CSI reporting specification.

It is noted that the information in the above section is only for enhancing the understanding of the background of the invention and therefore it may contain information that does not form prior art and is already known to a person of ordinary skill in the art.

SUMMARY OF THE INVENTION

The current 3GPP Type-I and Type-II CSI reporting schemes are mainly used in frequency division duplex (FDD) system configurations and do not exploit properties of uplink/downlink channel reciprocity. Contrary to FDD system configurations, channel reciprocity is mainly applicable in time division duplex (TDD) systems in which the same carrier is used for uplink and downlink transmissions. Channel measurements performed in the uplink at the base station (gNB) may be used to support downlink transmissions, for example downlink beamforming, without additional feedback or with reduced feedback from the UE.

In FDD systems, channel reciprocity is usually not satisfied since the duplex distance between the uplink and the downlink carriers may be larger than the channel coherence bandwidth. A known approach to obtain CSI even in FDD systems at the base station without UE assistance is based on channel extrapolation. There, it is assumed that the downlink channel and/or its multipath parameters may be calculated by an extrapolation of the channel response (or its multipath parameters) measured in the uplink. However, measurement results show that such an extrapolation, especially with respect to the phase of the multipath components of the channel, may be inaccurate and lead to inaccurate results. Recently, it was found that for a variety of scenarios the spatial and delay properties of the uplink and downlink channel responses in FDD systems are strongly correlated, hence, the channel may be considered as partial reciprocal with respect to the angle(s) and delay(s) of the multipath components.

In current Release 16 Type-II CSI reporting the UE needs to calculate a set of beams or beamforming vectors, a set of delays or delay vectors, and a set of precoder coefficients for the selected beams and delays of the precoder matrix. This, however, results in an increased complexity of the precoder calculation and a feedback overhead of the CSI report. Further, the calculation and reporting of the beams and delays is based on codebooks with a limited resolution, i.e., the information of angles and delays of multipath components of the channel is available at the gNB only with a reduced resolution due to its quantization with a codebook. This reduces the performance of a corresponding precoded downlink transmission employing the precoder coefficients reported by the UE. The present invention addresses these drawbacks. In detail, methods that significantly reduce the feedback overhead and the computational complexity at the user equipment for codebook-based CSI reporting, assuming information of angles and delays of multipath components of the channel is available at the base station, are proposed.

In accordance with embodiments of the present invention angular and delay information obtained at the gNB by uplink channel sounding measurements is used to precode/beamform a set of CSI-RS resources. The precoded/beamformed CSI-RS resources are used for downlink channel measurements and CSI calculations at the UE. Based on the downlink measurements of the precoded/beamformed CSI-RS, the UE calculates and reports a set of complex precoder coefficients for the configured antenna ports, wherein each antenna port is assumed to be associated with a beam and a delay. As the UE only determines a set of precoder coefficients for the configured ports and does not require to calculate beams and delays for the precoder matrix as in Type-II CSI reporting, the complexity of the precoder calculation and the feedback overhead of the CSI report will be reduced drastically. Moreover, as the information of the angles and delays of the multipath components of the channel is available at the gNB with a high resolution and not quantized with a codebook and reported by the UE, the performance of the corresponding precoded downlink transmission employing the precoder coefficients reported by the UE is significantly higher than the performance achieved by Type-II CSI reporting.

The advantageous solutions to these problems are found in the inventive method performed by a user equipment for generating a channel state information report in a wireless communication system as defined throughout this disclosure, together with the inventive method performed by a network node for receiving a channel state information report generated by a user equipment in a wireless communication system throughout this disclosure.

The advantageous solutions are also found through the inventive user equipment in a wireless communication system adapted to generate a channel state information report as defined throughout this disclosure, together with the inventive network node adapted to receive a channel state information report generated by a user equipment in a wireless communication system as defined throughout this disclosure.

The advantageous solutions are also found through the inventive wireless communication system according to this disclosure, and through the inventive computer program code according to this disclosure.

BRIEF DESCRIPTION OF THE DRAWINGS

Embodiments of the present invention are now described in further detail with reference to the accompanying drawings, in which.

DETAILED DESCRIPTION OF PREFERRED EMBODIMENTS

In the following, preferred embodiments of the present invention are described in further detail with reference to the enclosed drawings in which elements having the same or similar function are referenced by the same reference signs.

Figure 1A:
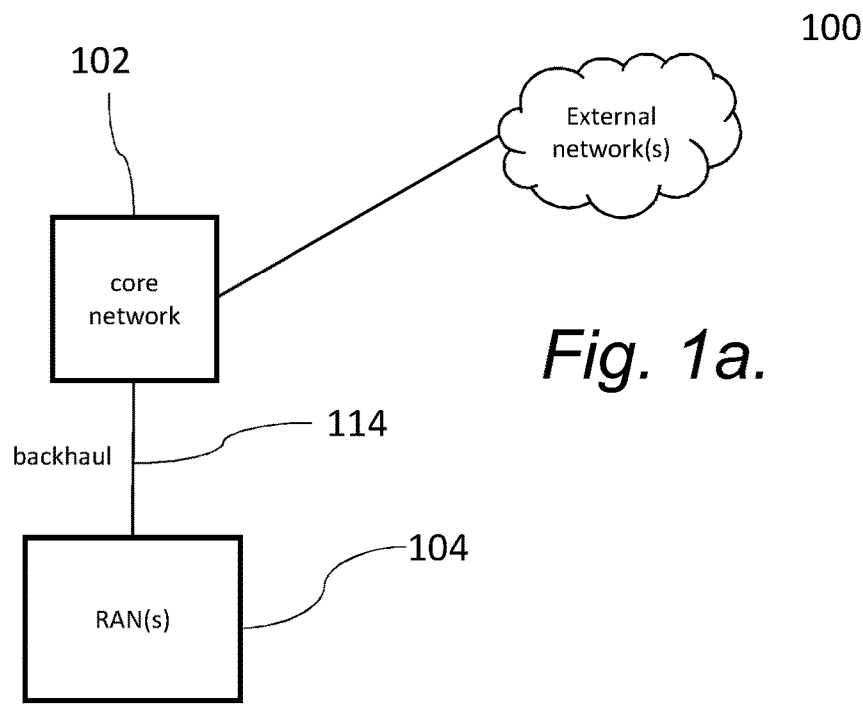
FIG. 1 shows a schematic representation of a wireless communication system.
Figure 1B:
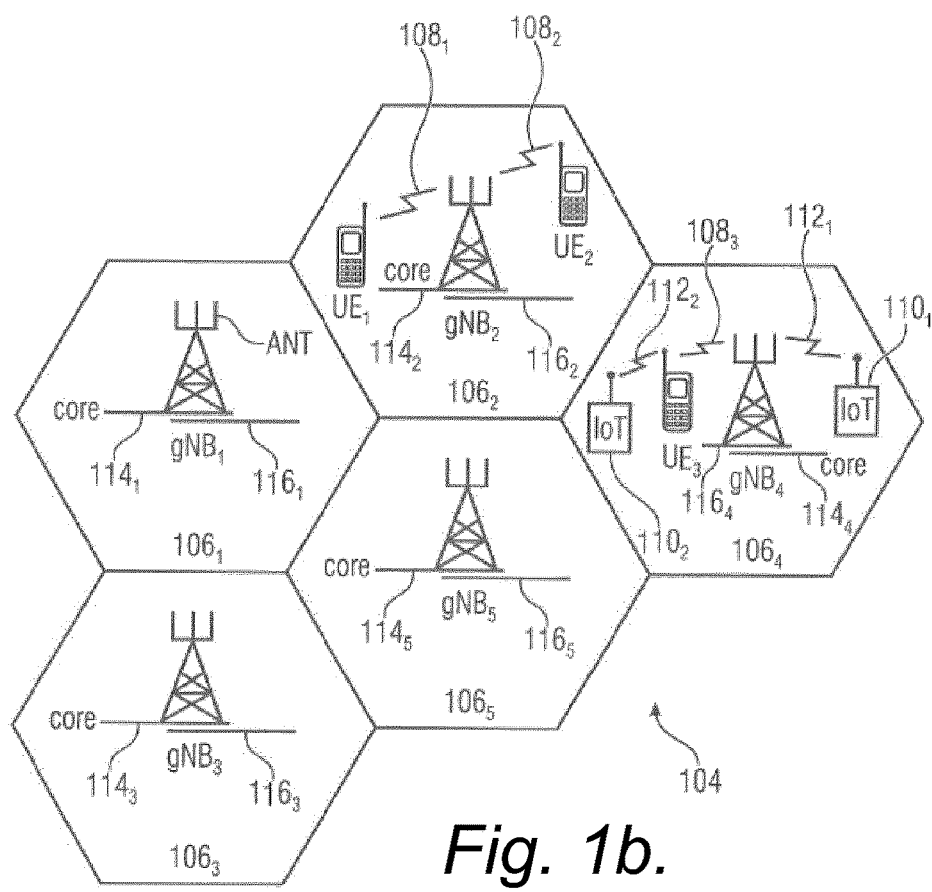
Figure 2:
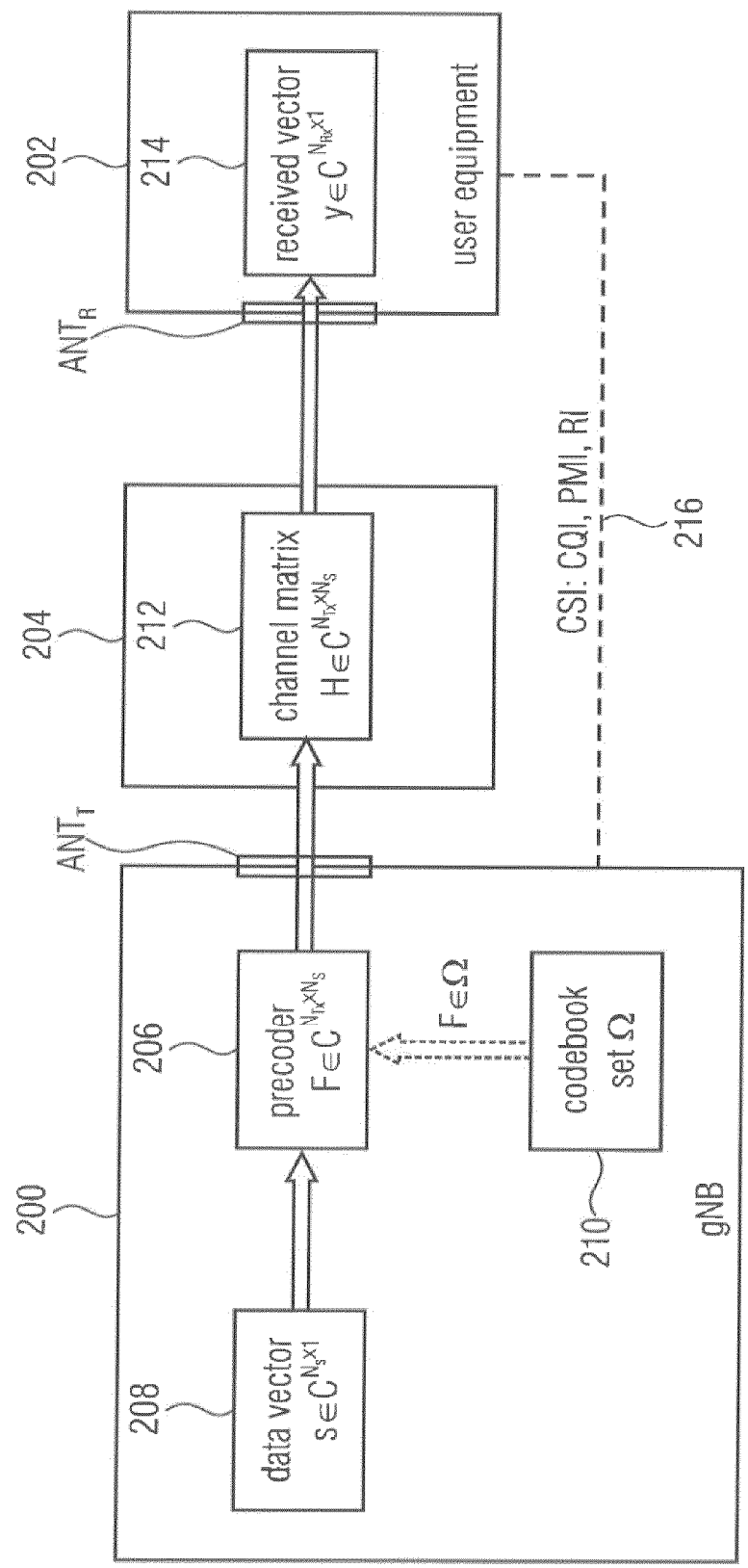
FIG. 2 shows a block-based model of a MIMO DL transmission using codebook-based-precoding in accordance with LTE release 8.
Figure 3:
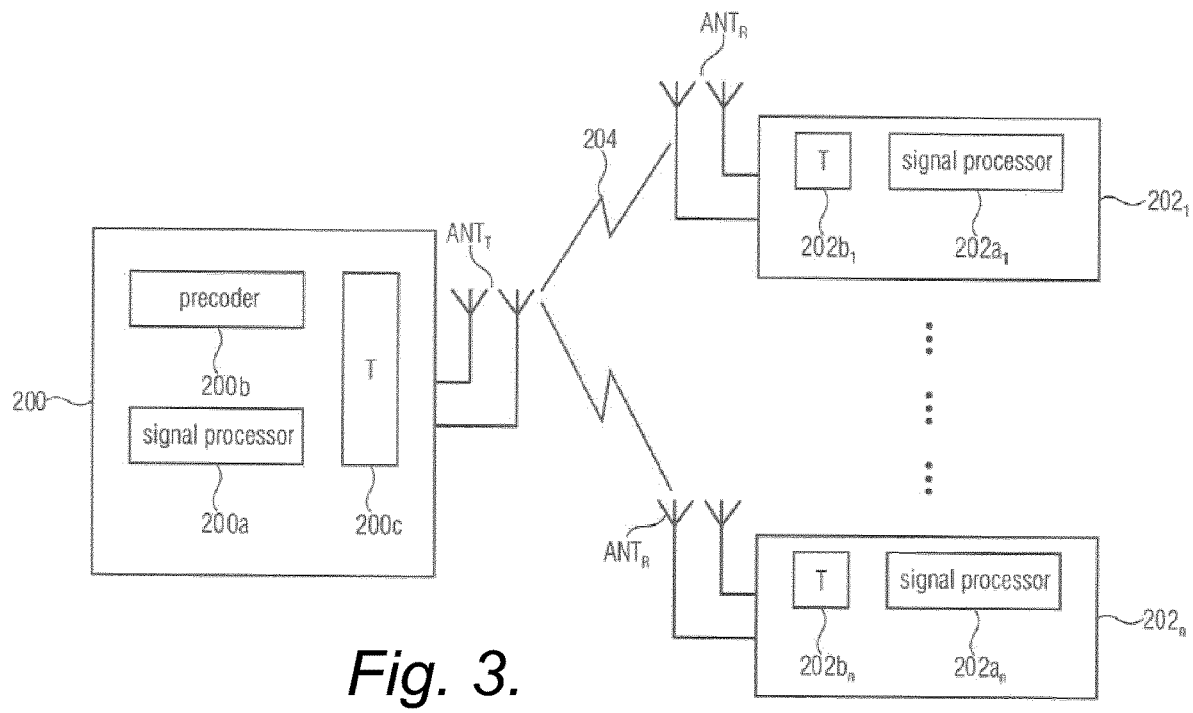
FIG. 3 is a schematic representation of a wireless communication system for communicating information between a transmitter, which may operate in accordance with the inventive teachings described herein, and a plurality of receivers, which may operate in accordance with the inventive teachings described herein.

Embodiments of the present invention may be implemented in a wireless communication system or network as depicted in FIG. 1 or FIG. 2 including transmitters or transceivers, like base stations, and communication devices (receivers) or users, like mobile or stationary terminals or IoT devices, as mentioned above. FIG. 3 is a schematic representation of a wireless communication system for communicating information between a transmitter 200, like a base station, and a plurality of communication devices 202$_1$ to 202$_n$, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, and a signal processor 200$a$. The UEs 202 include one or more antennas $ANT_R$ or an antenna array having a plurality of antennas, a signal processor 202$a_1$, 202$a_n$, and a transceiver 202$b_1$, 202$b_n$. The base station 200 and the respective UEs 202 may operate in accordance with the inventive teachings described herein.

Method

The present invention provides a method for providing feedback about a MIMO channel between a transmitter and a receiver in a wireless communication system according to the present invention.

Computer Program Product

The present invention provides a computer program product comprising instructions which, when the program is executed by a computer, causes the computer to carry out one or more methods in accordance with the present invention.

User Equipment

The present invention provides a user equipment apparatus in a wireless communication system, the user equipment is configured to generate a channel state information, CSI, report for providing feedback about a MIMO channel between a network node and the user equipment in the wireless communication system, according to the present invention.

The present invention proposes the use of a user equipment, UE, comprising a processor and a memory, which memory contains instructions executable by the processor whereby the UE is operative to perform any one of the subject-matter of the inventive method relating to a method performed by a user equipment.

Network Node

The present invention proposes the use of a network node comprising a processor and a memory, which memory contains instructions executable by the processor whereby the network node is operative to perform any one of the subject-matter of the inventive method relating to a method performed by a network node.

System

The present invention provides a wireless communication system operated in accordance with the inventive method. Further, the present invention provides a wireless communication system including one or more of the inventive receivers and/or one or more of the inventive transmitters.

In accordance with embodiments, the transmitter and/or the receiver mentioned above may include one or more of the following: a UE, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or a macro cell base station, or a small cell base station, or a central unit of a base station, or a distributed unit of a base station, or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

One proposed embodiment of the present invention relates to a method for providing feedback about a MIMO channel between a transmitter, like a network node, e.g., a gNB, and a receiver, like a UE, in a wireless communication system described in the following steps.

In a step S11, the UE is provided from a network node with a CSI report configuration via a higher layer (e.g., RRC), the CSI report configuration indicating a number of antenna ports or CSI-RS ports. An antenna port, or simply port, is a CSI-RS port. In the following antenna port, port and CSI-RS port are interchangeably used. The one or more antenna ports are associated with one or more reference signals. The CSI report configuration information also includes at least one parameter, D, for indicating a first basis set of D basis vectors used at the UE for constructing for each transmission layer a precoding vector or matrix for a rank set, wherein the first basis set is a subset of a basis set comprising $N_3$ basis vectors, wherein $D<N_3$.

In step S12, the receiver receives a radio signal via the MIMO channel, wherein the radio signal includes the one or more reference signals, like one or more CSI-RS signal(s), which are associated with the antenna ports.

In a step S13, the receiver determines for each transmission layer a precoding vector or matrix based on the received radio signal, wherein the precoding vector or matrix to be used at the transmitter so as to achieve a predefined property for a communication over the MIMO channel. The precoding vector or matrix is determined based on the received reference signal(s) for a rank value RI or v of the rank set, a first basis set comprising D basis vectors, a second basis set comprising P basis vectors, and a number of combining coefficients or precoder coefficients for combining selected vectors from the first and second basis sets.

In a step S14, the receiver reports a feedback in the form of one or more CSI reports to the transmitter. The feedback indicates the precoding vector or matrix for each transmission layer determined by the receiver. The CSI report also comprises for each transmission layer or subsets of transmission layers or all transmission layers an indication of a subset of P' selected basis vectors from the second basis set, wherein P'<P or P'≤P, and for each of the P' basis vectors an indication of D'<D or D'≤D selected basis vectors from the first basis set.

Another proposed embodiment of the present invention relates to a method performed by a user equipment, UE, for providing channel state information, CSI, feedback in the form of one or more CSI reports in a wireless communication system described in the following steps.

In a step S21, the UE receives from a network node a radio signal via a MIMO channel. The radio signal includes the CSI-RS signal(s) according to the one or more CSI-RS resource configuration(s). The CSI-RS signal(s) is/are provided over a configured number of frequency (and time) domain resources, and one or more antenna port(s) or one or more CSI-RS port(s).

In a step S22, the UE determines for each CSI report configuration a precoding vector or matrix for a number of antenna ports, subbands or resource blocks indicated by the CSI report configuration(s) based on the received downlink CSI-RS signals. The precoding vector or matrix is determined for each transmission layer based on the received reference signal(s), a first basis set comprising D basis vectors, a second basis set comprising P basis vectors, and a number of combining coefficients or precoder coefficients for combining selected vectors from the first and second basis sets.

In a step S23, the UE reports to the transmitter (network node) a Channel State Information, CSI, feedback, and/or a Precoder matrix Indicator, PMI and/or a PMI/Rank Indicator, PMI/RI, used to indicate the precoding matrix for the antenna ports selected by the UE from the configured antenna ports and subbands and/or resource blocks. The CSI feedback, or the PMI as a part of the CSI feedback, includes for each transmission layer or subsets of transmission layers or all transmission layers of the precoding vector or matrix an indication of a subset of P' selected basis vectors from the second basis set, wherein P'<P or P'≤P, and for each of the P' basis vectors an indication of D'<D or D'≤D selected basis vectors from the first basis set.

It is noted that the steps S11, S12, S13, S14 and S21, S22, S23 of the methods described above also represent a description of a corresponding block or feature of a corresponding apparatus, e.g., the corresponding base station, like base station 200 described with reference to FIG. 2 or FIG. 3, or the corresponding UE, like UE 202 described with reference to FIG. 2 or FIG. 3.

Codebook-Based Precoder Structure

In accordance with embodiments, a user equipment for generating a channel state information, CSI, report in a wireless communication system, the UE comprising:
- receiving from a network node, like a base station, CSI report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D < N_3$, and $N_3$ is a number of subbands,
- identifying a precoding vector matrix for each transmission layer based on the first basis set, a second basis set comprising P basis vectors, and a number of combining coefficients for combining selected vectors from the first and second basis sets,
- generating a CSI report based on the CSI report configuration information for a rank value RI or v of the rank set, wherein the CSI report comprises for each transmission layer or subsets of transmission layers or all transmission layers an indication of a subset of P' selected basis vectors from the second basis set, wherein P'<P or P'≤P, and for each of the P' basis vectors an indication of D'<D or D'≤D selected basis vectors from the first basis set, and
- transmitting the CSI report over an uplink channel.

In accordance with embodiments, the precoding vector for a transmission layer is based on a first basis set of D basis vectors, a basis set comprising P' basis vectors wherein the vectors are selected from a second basis set of P basis vectors, each vector of size $P \times 1$ or $P/2 \times 1$, wherein P is a number of antenna ports or CSI-RS ports configured to the UE, and P'<P or P'≤P and $N_3$ is a number of subbands or PRBs or frequency domain units/components used for PMI reporting configured to the UE or reported by the UE. The precoding vector or matrix $W^l$ for the l-th transmission layer may be defined by $$W^l = W_{1,l} W_{2,l} W_{f,l}^H, \text{ or}$$

$$W^l = \sum_{p=0}^{P'-1} \sum_{d=0}^{D-1} c_{l,p,d}(b_{l,p} a_{l,p,d}^H) = \sum_{d=0}^{D-1} \sum_{p=0}^{P'-1} c_{l,p,d}(b_{l,p} a_{l,p,d}^H), \text{ or}$$

$$W^l = \begin{bmatrix} \sum_{p=0}^{P'-1} \sum_{d=0}^{D-1} c_{l,p,d}(b_{l,p} a_{l,p,d}^H) \\ \sum_{p=0}^{P'-1} \sum_{d=0}^{D-1} c_{l,p+P',d}(b_{l,p,d} a_{l,p,d}^H) \end{bmatrix},$$

where
- $W_{1,l}$ is a matrix comprising P' selected basis vectors from the second basis set,
- $W_{2,l}$ is a coefficient matrix,
- $W_{f,l}^H$ is a matrix comprising D or less than D basis vectors from the first basis set,
- $b_{l,p}$ is a $P \times 1$ vector or $P/2 \times 1$ basis vector from the second basis set,
- $a_{l,p,d}$ is a $N_3 \times 1$ basis vector from the first basis set, and
- $c_{l,p,d}$ is a complex precoder coefficient or combining coefficient.

In accordance with embodiments, each basis vector from the first basis set is defined by an DFT-vector or IDFT-vector of size $N_3 \times 1$.

In accordance with embodiments, each basis vector from the second basis set is either of size $P \times 1$ or $P/2 \times 1$ and comprises a single one and zeros elsewhere. Hence, the second basis set comprising P basis vectors may be either defined by an identity matrix of size $P \times P$ or an identity matrix of size $P/2 \times P/2$. Moreover, when the second basis set is defined by an $P \times P$ identity matrix, each basis vector from the second basis set is associated with a single antenna port and when the second basis set is defined by an $P/2 \times P/2$ identity matrix, each basis vector from the second basis set is associated with two antenna ports, wherein the two antenna ports are associated with two different polarizations. In some examples, P/2 antenna ports are associated with a first polarization and P/2 antenna ports are associated with a second polarization.

The precoding vector or matrix for each transmission layer is based on P' selected basis vectors from the second basis set, wherein the selection is polarization-common when each vector of the second basis set is associated with two antenna ports of different polarizations, and polarization-independent when each vector of the second basis set is associated with a single antenna port.

In accordance with embodiments, the columns of the precoding vector or matrix $W^l$ for l=0, ..., v−1 are normalized to norm one, wherein v denotes the overall rank of the transmission precoding vector or matrix.

In the following, a high-rank CSI reporting, wherein v>1 is considered. Here, v denotes the rank, or simply RI value, and indicates the number of layers of the precoding matrix indicated in the CSI report. The v layers of the precoding matrix are indicated as follows l=0, 1, 2, ..., v−1.

Number of Subbands:

In accordance with embodiments, the UE is configured to determine the dimension of the first basis set $N_3$ based on the higher layer configuration parameter, number of CQI subbands $N_{CQI}$ as $N_3 = \lceil QN_{CQI} \rceil$, where $Q \geq 1$ and Q is indicated in the CSI report by the UE.

In accordance with embodiments, the UE is configured to determine the dimension of the first basis set $N_3$ based on the parameter Q and number of CQI subbands $N_{CQI}$ as $N_3 = \lceil Q \cdot N_{CQI} \rceil$, wherein the parameter Q is higher layer configured to the UE or known to the UE, e.g., fixed in the NR specification.

Configuration/Indication of Parameter D

In accordance with embodiments, the UE is configured to receive a CSI report configuration information including at least one parameter, D, for indicating a first basis set of D basis vectors used for constructing for each transmission layer a precoding vector or matrix for a rank set or a layer set, wherein the first basis set is a subset of a basis set comprising $N_3$ basis vectors, wherein $D < N_3$.

In one exemplary embodiment, one of the following sets may define the rank set: RI∈{1} RI∈{1,2}, RI∈{2,3,4}, RI∈{3,4} or RI∈{1,2,3,4}, wherein RI denotes the rank of the precoder vector or matrix. In the following RI and v are interchangeably used.

In one exemplary embodiment, one of the following sets may define the layer set: l∈{0}, l∈{0,4}, l∈{1,2,3}, l∈{2,3} or l∈{0,1,2,3}, wherein l denotes the index for a layer of the precoder vector or matrix.

In accordance with embodiments, the rank set comprises a first rank set and a second rank set, and the CSI reporting configuration information comprises at least one parameter $D_0$ for indicating $D_0$ basis vectors for the first basis set for the first rank set and at least one parameter $D_1$ for indicating $D_1$ basis vectors for the first basis set for the second rank set. In one example, the first rank set is defined by RI∈{1,2} and the second rank set is defined by RI∈{3,4}. In another example, the first rank set is defined by RI∈{1} and the second rank set is defined by RI∈{2,3,4}. In another example, the first rank set is defined by RI∈{1,2,3} and the second rank set is defined by RI∈{4}.

In accordance with embodiments, the layer set comprises a first layer set and a second layer set, and the CSI reporting configuration information comprises at least one parameter $D_0$ for indicating $D_0$ basis vectors for the first basis set for the first layer set and at least one parameter $D_1$ for indicating $D_1$ basis vectors for the first basis set for the second layer set. In one example, the first layer set is defined by l∈{0,1} and the second layer set is defined by l∈{2,3}. In another example, the first layer set is defined by l∈{0} and the second layer set is defined by l∈{1,2,3}. In another example, the first layer set is defined by l∈{0,1,2} and the second layer set is defined by l∈{3}.

In accordance with embodiments, the UE is configured to select D' basis vectors from the first basis set, wherein $D'<D_0$ or $D'≤D_0$ when the rank RI or v of the precoding vector or matrix belongs to the first rank set and $D'<D_1$ or $D'≤D_1$ when the rank value v of the precoding vector or matrix belongs to the second rank set.

In accordance with embodiments, the UE is configured to select D' basis vectors from the first basis set, wherein $D'<D_0$ or $D'≤D_0$ when a layer of the precoding vector or matrix belongs to the first layer set and $D'<D_1$ or $D'≤D_1$ when a layer of the precoding vector or matrix belongs to the second layer set.

In accordance with embodiments, the CSI reporting configuration information comprises a parameter $D_0$ for indicating $D_0$ basis vectors for the first basis set for the rank set, and a parameter $D_1$, indicating $D_1$ basis vectors for the first basis set for another rank set, is derived by the UE at least from the parameter $D_0$.

In accordance with embodiments, the CSI reporting configuration information comprises a parameter $D_0$ for indicating $D_0$ basis vectors for the first basis set for the layer set, and a parameter $D_1$, indicating $D_1$ basis vectors for the first basis set for another layer set, is derived by the UE at least from the parameter $D_0$.

In accordance with embodiments, the UE is configured to select D' basis vectors from the first basis set, wherein $D'<D_0$ or $D'≤D_0$ when the rank value RI or v of the precoding vector or matrix belongs to the rank set, and $D'<D_1$ or $D'≤D_1$ when the rank value RI or v of the precoding vector or matrix belongs to the another rank set.

In accordance with embodiments, the UE is configured to select D' basis vectors from the first basis set, wherein $D'<D_0$ or $D'≤D_0$ when a layer of the precoding vector or matrix belongs to the layer set, and $D'<D_1$ or $D'≤D_1$ when a layer of the precoding vector or matrix belongs to the another layer set.

In accordance with embodiments, the number of basis vectors, D, of the first basis set are indicated to the UE, determined by the UE (e.g., the parameter D is fixed in the NR specifications), or reported by the UE. In an exemplary embodiment, the parameter D is indicated to the UE via a higher layer configuration (e.g., the CSI report configuration) from the network node.

In one exemplary embodiment, the number of basis vectors, $D_0$, of the first basis set depends on the layer index or layer-group index, wherein $D_0$ is configured to the UE for a first layer set comprising one or more layers (e.g., a first layer or a first layer and a second layer), and the parameter $D_1$ for a second layer set comprising one or more layers (e.g., a second layer, or a third layer, or a third and fourth layer) is determined and reported by the UE as a part of the CSI report, or configured to the UE.

In one exemplary embodiment, the parameter D is smaller than $N_3$, i.e., $D<N_3$, where $N_3$ is a number of subbands, PRBs or frequency domain units/components used for PMI reporting configured to the UE or reported by the UE. Hence, the first basis set used for constructing the precoding vector or matrix may be defined by a proper submatrix of size $D×N_3$ of a DFT-matrix or IDFT-matrix of size $N_3×N_3$, wherein each vector of the first basis set is represented by an DFT- or IDFT-vector (of size $N_3×1$). In another exemplary embodiment, the parameter is $D=N_3$. Then, the first basis set is defined by an full DFT-matrix or IDFT-matrix of size $N_3×N_3$, and each vector of the first basis set is represented by an DFT- or IDFT-vector (of size $N_3×1$).

In an exemplary embodiment, the parameter D (indicating the number of basis vectors of the first basis set) depends on the layer index, or on the layer-group index and is decreasing or increasing with increasing layer indices or layer group indices. In one example, for RI=4, D=1 for the first layer, D=2 for the second layer, D=3 for the third layer, and D=5 for the fourth layer. In one example, for RI=4, D=1 for the first layer-group comprising the first layer and second layer, and D=3 for the second layer-group comprising the third layer and fourth layers. In one example, for RI=3, D=1 for the first layer-group comprising the first layer and second layer, and D=3 for the second layer-group comprising the third layer. In one example, for RI=2, D=1 for the first layer-group comprising the first layer and second layer. In one example, for RI=1, D=1 for the first layer-group comprising only the first layer. In one example, for RI=4, D=4 for the first layer, D=3 for the second layer, D=2 for the third layer, and D=1 for the fourth layer. In one example, for RI=4, D=4 for the first layer-group comprising the first layer and second layer, and D=2 for the second layer-group comprising the third layer and fourth layers. In one example, for RI=3, D=2 for the first layer-group comprising the first layer and second layer, and D=1 for the second layer-group comprising the third layer. In one example, for RI=2, D=2 for the first layer-group comprising the first layer and second layer.

In accordance with embodiments, when D=1 (e.g., for a layer, subset of layers or all layers) the first basis set comprises a single vector wherein all elements of the vector are '1's.

In an exemplary embodiment, the parameter D (indicating the number of basis vectors of the first basis set) depends on the layer index, or on the layer-group index and is configured to the UE for at least one layer-group set (e.g., layer indices l=0,1) and reported by the UE for at least another layer group set (e.g., layer indices l=2,3). Here a layer-group set may comprise at least one layer index. Note that the layer indices of the layer-group sets can be different to each other. This means when there are at least two layer-groups, the layer indices of the first layer-group set can be different to the layer indices of the second layer-group set.

In an exemplary embodiment, the parameter D (indicating the number of basis vectors of the first basis set) depends on the layer index, or on the layer-group index and is fixed in the NR specifications for at least one layer-group set (e.g., a set comprising layer indices l=0,1), and determined and reported by the UE for at least one another layer group set (e.g., a set comprising layer indices l=2,3). The parameter D (and hence the number of basis vectors of the first basis set) for at least one first layer-group set is either explicitly specified in the NR specifications, or determined from at least one other parameter configured to the UE. Here a layer-group set may comprise at least one layer index. Note that the layer or layer indices of the layer-group sets can be different to each other. This means when there are at least two layer-groups, the layer indices of the first layer-group set can be different to the layer indices of the second layer-group set.

In one exemplary embodiment, the parameter D (indicating the number of basis vector of the first basis set) is RI-common for $v \in \{1,2,3,4\}$ or $RI \in \{1,2,3,4\}$ and layer-common. This means, a single parameter D (and hence the number of basis vectors of the first basis set) is used for all layers l=0,1,2, ..., v−1 and for all RI values $v \in \{1,2,3,4\}$. The parameter D may be configured to the UE, determined by the UE (e.g., using one or more other parameters such as the RI value), reported by the UE, or is known by the UE, e.g., the parameter D is defined in the NR specifications.

In one exemplary embodiment, the parameter D (indicating the number of basis vectors of the first basis set) is RI-common for $v \in (1,2,3,4)$ or $RI \in (1,2,3,4)$ and layer-specific or layer-group-specific. This means, a single parameter D (and hence the number of basis vectors of the first basis set) is used for each layer l=0,1,2, ..., v−1 or subset of layers (e.g., l=0,1, and l=2,3) for all RIs $v \in \{1,2,3,4\}$. The parameter D can be different for each layer or subsets of layers. For example, the parameter D may depend on the layer-index or layer-group-index, but it does not depend on the RI value. Hence, one or more parameter(s) D (for each layer or subsets of layers) may be configured to the UE, determined by the UE (e.g., using one or more other parameters such as the RI value), reported by the UE, or is/are known by the UE, e.g., the one or more parameter(s) D may be defined in the NR specifications.

In one exemplary embodiment, the parameter D (indicating the number of basis vectors of the first basis set) is RI-common for a rank set, e.g., $v \in \{2,3,4\}$ or $v \in \{3,4\}$, and layer-common. This means, a single parameter D (and hence the number of basis vectors of the first basis set) is used for all layers l=0,1,2, ..., v−1 and for all RI values of the rank set $v \in \{2,3,4\}$ or $v \in \{3,4\}$. The parameter D may be configured to the UE, determined by the UE (e.g., using one or more other parameters such as the RI value), reported by the UE, or it is known by the UE, e.g., the parameter D is defined in the NR specifications.

In one exemplary embodiment, D (indicating the number of basis vectors of the first basis set) is RI-common for a rank set, e.g., $v \in \{2,3,4\}$ or $v \in \{3,4\}$, and layer-specific or layer-group-specific. This means, a single parameter D is used for each layer l=0,1,2, ..., v−1 or subsets of layers (e.g., l=0,1, and l=2,3) for all for all RI values of the rank set $v \in \{2,3,4\}$ or $v \in \{3,4\}$. The parameter D (and hence the number of basis vectors of the first basis set) can be different for each layer or subsets of layers. Hence, one or more parameter(s) D may be configured to the UE, determined by the UE (e.g., using one or more other parameters such as the RI value), reported by the UE, or known by the UE, e.g., the one or more parameter(s) D may be defined in the NR specifications.

In one exemplary embodiment, the parameter D (including the number of basis vectors of the first basis set) is RI-specific for a rank set, e.g., $v \in \{2,3,4\}$ or $v \in \{3,4\}$, and layer-common. This means, a single parameter D (and hence the number of basis vectors of the first basis set) is used for each RI value or for subsets of RI values from the rank set. The parameter D is identical for all layers l=0,1,2, ..., v−1 for a given RI value v, but it can be different for each RI value or subsets of RI values. Hence, one or more parameter(s) D (for each layer or subsets of layers) may be configured to the UE, determined by the UE (e.g., using one or more other parameters such as the RI value), reported by the UE, or known by the UE, e.g., the one or more parameter(s) D may be defined in the NR specifications.

In one exemplary embodiment, D (indicating the number of basis vectors of the first basis set) is RI-specific for a rank set, e.g., $v \in \{2,3,4\}$ or $v \in \{3,4\}$, and layer-specific or layer-group-specific. This means, a single parameter D (and hence number of basis vectors of the first basis set) is used for each RI value or subset of RI values and layer or subset of layers. The parameter K can be different for all layers l=0,1, 2, ..., v−1 or subset of layers for a given RI value v from the rank set. Hence, one or more parameter(s) D (for each layer or subsets of layers) may be configured to the UE, determined by the UE (e.g., using one or more other parameters such as the RI value), reported by the UE, or known by the UE, e.g., the one or more parameter(s) D may be defined in the NR specifications.

In one exemplary embodiment, the parameter D is RI-common for a rank set, e.g., $RI \in \{1,2\}$ or $RI \in \{3,4\}$, wherein a single parameter D for all layers is configured to the UE, determined by the UE (e.g., using one or more other parameters such as the RI value), reported by the UE, or known by the UE, e.g., the parameter D is defined in the NR specifications.

Note that in the above examples, a rank set may comprise a subset of N RI values from the set $RI \in \{1,2,3,4\}$, wherein N≤2 or N<4.

In one exemplary embodiment, the number of basis vectors of the first basis set is RI-common for a first rank set, wherein a single parameter $D_0$, indicating the number of basis vectors of the first basis set for all layers of the precoder vector or matrix, is configured to the UE, and the number of basis vectors of the first basis set is RI-common for a second rank set, wherein a single parameter $D_1$, indicating the number of basis vectors of the first basis set for all layers of the precoder vector or matrix, is determined by the UE (e.g., by a fixed rule based on the RI value), or configured to the UE, or reported by the UE. The RI values of the first rank set may be different to the RI values of the second rank set. In one example, the first rank set is given by $RI \in \{1\}$ and the second rank set is given by $RI \in \{2,3,4\}$. In another example, the first rank set is given by $RI \in \{1,2\}$ and the second rank set is given by $RI \in \{3,4\}$. In another example, the first rank set is given by $RI \in \{1,2,3\}$ and the second rank set is given by $RI \in \{4\}$.

In one exemplary embodiment, the number of basis vectors of the first basis set is RI-common for a first rank set, wherein one or more parameter(s) $D_0$, indicating the number of basis vectors of the first basis set for subsets of layers of the precoder vector or matrix, is configured to the UE, and the number of basis vectors of the first basis set is RI-common for a second rank set, wherein one or more parameter(s) $D_1$, indicating the number of basis vectors of the first basis set for subsets of layers of the precoder vector or matrix, is determined by the UE (e.g., by a fixed rule based on the RI value), configured to the UE, or reported by the UE. Here, a subset of layers may comprise all RI layers or less than RI layers for each rank of the rank set. The RI values of the first rank set may be different to the RI values of the second rank set. In one example, the first rank set is given by $RI \in \{1\}$ and the second rank set is given by $RI \in \{2,3,4\}$. In another example, the first rank set is given by $RI \in \{1,2\}$ and the second rank set is given by $RI \in \{3,4\}$. In another example, the first rank set is given by $RI \in \{1,2,3\}$ and the second rank set is given by $RI \in \{4\}$.

Note that in the above examples, a layer subset may comprise N layer indices from the set of $l \in \{0,1, \ldots, v-1\}$ layer indices, wherein $N \le v$ or $N < v$.

In accordance with embodiments, the basis vectors of the first basis set is a subset of a basis set comprising $N_3$ basis vectors, wherein $D < N_3$, and wherein the D basis vectors of the first basis set are given by the first D basis vectors of the basis set containing $N_3$ basis vectors. In one option, the basis set comprises a $N_3 \times N_3$ DFT based matrix $[a_0, a_1, \ldots a_{N_3-1}]$ and the first basis set comprises the D basis vectors $(a_0, \ldots, a_{D-1})$.

In one example, the D basis vectors of the first basis set are given by the first $D_a$ basis vectors and the last $D_b$ basis vectors of the basis set containing $N_3$ basis vectors, wherein $D_a + D_b = D$. In one option, the basis set comprises a $N_3 \times N_3$ DFT based matrix comprising basis vectors $[a_0, a_1, a_{N_3-1}]$ and the first basis set comprises the D basis vectors $(a_0, \ldots, a_{D_a-1}, a_{N_3-D_b}, \ldots, a_{N_3-1})$.

In another example, the D basis vectors of the first basis set are given by the D basis vectors associated with the indices $a_i, \forall_i = 0, \ldots, D-1$ from the basis set containing $N_3$ basis vectors where $a_i = \text{mod}(a_s + i, N_3), \forall_i = 0, \ldots, D-1$, and wherein $a_s$ is the starting index of the basis vector from the basis set containing $N_3$ basis vectors. In one option, the basis set comprises a $N_3 \times N_3$ DFT based matrix comprising basis vectors $[a_0, a_1, \ldots a_{N_3-1}]$ and the first basis set comprises the D basis vectors $(d_0, \ldots d_{D-1}) = (a_{\text{mod}(a_s+0, N_3)}, \ldots, a_{\text{mod}(a_s+D-1, N_3)})$.

In another example, the D basis vectors of the first basis set are given by the D basis vectors associated with the indices $a_{i_n}, \forall i_n = 0, \ldots, D_n - 1, \forall_n = 0 \ldots N-1$ from the basis set containing $N_3$ basis vectors where $a_{i_n} = \text{mod}(a_{s_n} + i_n, N_3), \forall i_n = 0, \ldots, D_n - 1$, wherein $a_{s_n}$ is the starting index of the basis vector from the basis set containing $N_3$ basis vectors for the window n, and wherein $\sum_{n=0}^{N-1} D_n = D$ and wherein $a_s \ne a_{s_{n'}}, \forall n$. In one option, the basis set comprises a $N_3 \times N_3$ DFT based matrix comprising basis vectors $[a_0, a_1, \ldots a_{N_3-1}]$ and the first basis set comprises a total of D basis vectors. For window n, the first basis set comprises the $D_n$ basis vectors given by $(d_0, \ldots d_{D_n-1}) = (a_{\text{mod}(a_{sn}+0, N_3)}, \ldots, a_{\text{mod}(a_{sn}+D_n-1, N_3)})$. In one option, $a_s$ or $a_{s_{n'}} \forall n$ and/or N is configured to the UE.

Port Selection and Reporting

In accordance with embodiments, the UE is provided via a higher layer with a CSI report configuration by the network node, wherein the CSI report configuration indicates a higher layer parameter, P, indicating a number of antenna ports or CSI-RS ports.

In accordance with embodiments, the UE is configured to select a number of $P'_l$ basis vectors from the second basis set, wherein the $P'_l$ basis vectors are used to construct for each transmission layer the precoding vector or matrix, and to indicate the selected P' basis vectors from the second basis set in the CSI report, or PMI as a part of the CSI report.

In one exemplary embodiment, the number of selected basis vectors, $P'_l$ from the second basis set per transmission layer is identical for a subset of RI transmission layers, or all transmission layers $l = 0, \ldots, RI-1$, wherein RI denotes the transmission rank of the precoding vector or matrix. In some examples, $P'_l = P$ or $P'_l = P/2$ for a subset of RI transmission layers, or all transmission layers. In such a case, the precoding matrix is based on all P basis vectors from the second basis set for a subset of RI transmission layers, or all transmission layers. In some examples, $P'_l < P$ for each transmission layer, a subset of RI transmission layers, or all transmission layers. In some examples, $P'_l \le P$ or $P'_l = P$ or $P'_l \le P/2$ or $P'_l = P/2$ for a first set of the RI transmission layers, and $P'_l < P$ or $P'_l < P/2$ for a second set of the RI transmission layers. In one example, the first set of the RI transmission layers is $\{0,1\}$ and the second set of the RI transmission layers is $(2,3)$. In another example, the first set of the RI transmission layers is $\{2,3\}$ and the second set of the RI transmission layers is $\{0,1\}$.

In accordance with embodiments, the number of selected basis vectors, $P'_l$, from the second basis set per transmission layer satisfies a sum constraint across all RI transmission layers, wherein the total number of basis vectors selected from the second basis set across all layers is smaller than or equal to a value, R, with R being a positive integer. In one example, the sum constraint is defined by $\sum_{l=0}^{RI} P'_l \le P_0$ or $\sum_{l=0}^{RI} P'_l = P_0$. Here, $R = P_0$ denotes the maximum number of basis vectors selected by the UE across all layers. In one example, the value of R is configured to the UE. In another example, the value of R is fixed in the NR specification or derived by the UE based on the configured number of ports P or other configured parameters. In another example, the value of R is reported by the UE as a part of the CSI report.

In another example, the sum constraint is defined by $\sum_{l=0}^{RI} P'_l \le RI \cdot P_0$ or $\sum_{l=0}^{RI} P'_l = RI \cdot P_0$ or $\sum_{l=0}^{RI} P'_l < RI \cdot P_0$. Here, $R = RI \cdot P_0$ denotes the maximum number basis vectors selected by the UE across all layers. The number of vectors $P'_l$ per transmission layer may be selected by the UE. In addition, $P'_l < \bar{P}_l$, where $\bar{P}_l$ is the maximum number of basis vectors from the second basis set the UE can select for the l-th transmission layer. For example, the parameter $\bar{P}_l$ may be identical across all layers, then $\bar{P}_l = \bar{P}$. In one option, $\bar{P} = \alpha P_0$, wherein $\alpha < 1$ or $\alpha \le 1$. The parameter $\bar{P}$, $\alpha$, or the parameters $\bar{P}_l$ may be configured to the UE, or is/are fixed in the NR specifications and known to the UE. In one option, the parameter $P_0$ may be configured via a higher layer to the UE. In another option, the parameter $P_0$ is fixed in the NR specifications and known by the UE. In another option, the UE selects and reports the parameter $P_0$ (as a part of the CSI report).

In another example, for a given RI, the parameter $\bar{P}_l$ may be identical for a subset of layers and different for different subsets. In one option, $\bar{P}_l = \alpha_0 P_0$ for a first subset of layers (e.g., $\{0,1\}$) and $\bar{P}_l = \alpha_1 P_0$ for the second subset of layers (e.g., $\{2,3\}$), where in $\alpha_0 \ne \alpha_1$, and wherein $\alpha_0 < 1$ or $\alpha_0 \le 1$ and $\alpha_1 < 1$ or $\alpha_1 \le 1$. The parameters $P_0$, and/or $\alpha_0$ and/or $\alpha_1$ or the parameters $\bar{P}_l$ may be configured to the UE, or is/are fixed in the NR specifications and known to the UE. In one example, only $\alpha_0$ is configured and $\alpha_1$ is derived from $\alpha_0$ using a fixed rule. In one option, the parameter $P'_l$ for each subset may be configured via a higher layer to the UE. In another option, the parameter $\bar{P}_l$ for each subset is fixed in the NR specifications and known by the UE. In another option, the UE selects and reports the parameter $\hat{P}_l$ for each subset (as a part of the CSI report).

In another example, the parameter $\bar{P}_l$ may be different for different layers i.e., $P'_l = \alpha_l P_0$, wherein $\alpha_l \le 1$. The parameter $P_0$, $\alpha_l$, $\forall l>0$ or the parameters $\overline{P}_l$ may be configured to the UE, or is/are fixed in the NR specifications and known to the UE. In one option, only $\alpha_0$ is configured and $\alpha_l$, $\forall l>0$ is derived from $\alpha_0$ using a fixed rule. In another option, $\alpha_l$ is configured to the UE for each layer. In another option, the UE selects and reports the parameter $\overline{P}_l$ for each layer (as a part of the CSI report).

In one example, $\overline{P}$ is dependent on the actual number of CSI-RS ports P. For $P \le P_t$, $\overline{P}$ can be equal to P, whereas for $P > P_t$, $\overline{P} = \alpha P_0$, wherein $\alpha < 1$ or $\alpha \le 1$. In one option, $P_t \in \{4, 8, 16, 24\}$.

In one exemplary embodiment, the number of selected basis vectors, $P'_l$ from the second basis set per transmission layer is identical for a subset of RI transmission layers or all transmission layers $l=0, \ldots, RI-1$. Then, $P'_l = P'$ for the subset of RI transmission layers or all transmission layers.

In accordance with embodiments, the CSI report may comprise an RI, wherein the RI indicates the transmission rank (i.e., the number of transmission layers) of the precoding vector or matrix indicated by the CSI report, or the PMI as a part of the CSI report.

In accordance with embodiments, the CSI report, or the PMI as a part of the CSI report, may comprise a port indicator, PI, indicating the selected $P'_l$ basis vectors from the second basis set of the precoding vector or matrix.

In some examples, the CSI report, or the PMI as a part of the CSI report, comprises a PI defined by a combinatorial bit indicator $$\left\lceil \log_2 \binom{P}{P'_l} \right\rceil \text{ or } \left\lceil \log_2 \binom{P}{P'} \right\rceil \text{ or } \left\lceil \log_2 \binom{P/2}{P'_l} \right\rceil \text{ or } \left\lceil \log_2 \binom{P/2}{P'} \right\rceil$$

indicating the selected $P'_l$ or $P'$ basis vectors from the second basis set.

In some examples, the CSI report, or the PMI as a part of the CSI report, comprises a port indicator wherein the PI includes a bit map of size P or $$\frac{P}{2}$$

for each transmission layer or all transmission layers of the precoding matrix indicating the selected $P'_l$ or $P'$ basis vectors selected from the second basis set. Each bit in the bitmap may be associated with one basis vector of the second basis set. A '1' in the bitmap may indicate that the associated basis vector is selected, and '0' in the bitmap may indicate that the associated basis vector is not selected for the precoding vector or matrix.

In one instance, the selected $P'_l$ or $P'$ basis vectors selected from the second basis set are identical for a subset of the RI transmission layers or all RI transmission layers, and the CSI report, or the PMI as a part of the CSI report, comprises only a single PI for a subset of the RI transmission layers, or for all RI transmission layers.

In the following embodiments, different reporting schemes for the port indication that reduce the feedback overhead of the CSI report are presented.

In accordance with embodiments, the UE is configured to determine a common basis set comprising at least the selected basis vectors from the second basis set across a subset of the RI transmission layers or across all RI transmission layers, and to indicate the basis vectors of the common basis set in the CSI report. The indicator for the basis vectors of the common basis set is referred to as common basis set indicator (CBSI) in the following. The CSI report, or the PMI as a part of the CSI report, may include the CBSI. Moreover, the UE is configured to indicate the basis vectors selected from the common basis set for each transmission layer of the precoding vector or matrix by a layer-specific basis set indicator, LBSI, in the CSI report.

In some examples, the CBSI is given by a combinatorial bit indicator $$\left\lceil \log_2 \binom{P}{P'} \right\rceil \text{ or } \left\lceil \log_2 \binom{P/2}{P'} \right\rceil$$

indicating P' selected vectors from the second basis set across a subset of the RI transmission layers or across all RI transmission layers of the precoding vector or matrix. The parameter P' may be either configured to the UE, reported by the UE, or it is fixed in the NR specifications and known by the UE. In some examples, the CBSI is given by a bit map of size P or P/2 indicating P' basis vectors selected from the second basis set across a subset of the RI transmission layers or across all RI transmission layers of the precoding matrix. A '1' in the bitmap may indicate that the associated vector is selected for the precoding matrix, and '0' in the bitmap may indicate that the associated vector is not selected for the precoding matrix.

In some examples, the CBSI can be represented by a continuous set A comprising P' entries, wherein each entry/value of set A is associated with one basis vector of the second basis set. In one example, the continuous set A is represented by $A = \{P_S, P_S+1, \ldots, P_S+P'-1\}$. In another example, continuous set A is represented by $A = \{P_S \bmod P_A, (P_S+1) \bmod P_A, \ldots, (P_S+P'-1) \bmod P_A\}$ wherein $P_A = P$ or $P_A = P/2$. Here, a mod b denotes the modulo operator of a modulo b. The CBSI indicates P' basis vectors from the second basis set.

In accordance with embodiments, the parameter P' may be configured to the UE, or indicated by the UE in the CSI report, or known by the UE and fixed in the NR specification. The parameter P' may also be given by a combination of other parameters which are configured to the UE, or known by the UE and fixed in the NR specification.

In accordance with embodiments, the parameter $P_S$ may be configured to the UE, or indicated by the UE in the CSI report, or known by the UE and fixed in the NR specification. The parameter $P_S$ may also be given by a combination of other parameters which are configured to the UE, or known by the UE and fixed in the NR specification.

In some examples, the LBSI is defined for each transmission layer or by a P'-sized bitmap, and each bit in the bitmap is associated with one entry of the CBSI.

To indicate the basis vectors selected from the common basis set for each transmission layer of the precoding vector or matrix by a layer-specific basis set indicator, LBSI, is included in the CSI report.

The bitmap for the l-th layer may comprise $P'_l$ '1's or less than $P'_l$ '1's. A '1' in the bitmap may indicate that the associated port, or port index of the CPI, and hence the associated PS vector from the set of $P_A$ PS basis vectors, is selected for the precoding matrix for the l-th transmission layer. When the CPI is represented by set A, each bit in the bitmap is associated with one entry of set A.

In some examples, the layer-specific port indicator, LSPI, is defined by a combinatorial bit indicator $$\left\lceil \log_2 \binom{P'}{P'_l} \right\rceil$$

indicating $P'_l$ entries of the CBSI, and hence $P'_l$ PS vectors selected from the set of $P_A$ PS basis vectors, for the l-th transmission layer of the precoding matrix.

In accordance with embodiments, the UE is configured to group the basis vectors of the second basis set into B basis subsets, wherein each basis subset comprises a number of basis vectors. In one option, B is equal to P. In another option, B is less than P. The number of basis vectors per basis subset may be given by $$E = \frac{P}{B},$$

wherein each basis subset comprises E basis vectors, and wherein the parameter E or the parameter B can be configured to the UE, or it is fixed in the NR specifications, or it is determined by the UE based on the number of configured ports, P, or it is reported by the UE.

In accordance with embodiments, the basis vectors of the second basis set are grouped into B basis subsets, wherein each basis subset comprises a number of basis vectors, and the UE is configured to select $b_l$ basis subsets out of the B basis subsets per layer for the precoding vector or matrix and to indicate the selected $b_l$ basis subsets in the CSI report, wherein $b_l>0$.

In accordance with embodiments, the UE is configured to select b, basis subsets out of B basis subsets for each layer of the precoding vector or matrix and to indicate the selected $b_l$ basis subsets in the CSI report. In one example, the b, basis subsets are indicated per layer, subsets of layers, or all layers in the CSI report by a B-sized bitmap, where the b-th bit in the bitmap is associated with the b-th basis subset, and the bitmap contains $b_l$ '1's per layer. In another example, the $b_l$ basis subsets are indicated per layer, subsets of layers, or all layers in the CSI report by a combinatorial bit indicator $$\left\lceil \log_2 \binom{B}{b_l} \right\rceil.$$

The number of selected basis subsets ($b_l$) may be fixed, configured to the UE or reported to the gNB by the UE. When the selected basis subsets $b_l$ are identical for a subset of layers or all layers, a single indicator for each layer subset or all layers is used in the CSI report. In one example, the selected basis subsets $b_l$ is identical for all layers, a subset of layers or different for all layers. In another example, the number of selected basis subsets $b_l$ may be identical for all layers, a subset of layers or different for all layers.

In accordance with embodiments, the UE is configured to select a number of basis vectors within each selected basis subset per layer or subset of layers or all layers and indicate the selected basis vectors in the CSI report.

In one example, the selected basis vectors from b, basis subsets per layer are indicated in the CSI report by a $b_l$ E-sized bitmap. In another example, the selected basis vectors from $b_l$ basis subsets per layer are indicated in the CSI report by a combinatorial bit indicator $$\left\lceil \log_2 \binom{b_l E}{P'_l} \right\rceil,$$

where $P'_l$ basis vectors are selected from $b_l E$ basis vectors per layer. In another example, the selected basis vectors from b, basis subsets for a subset of layers or all layers may be indicated using a combinatorial $$\left\lceil \log_2 \binom{b'E}{P_0} \right\rceil,$$

where $b'=\Sigma_l b'_l$ and $P_0=\Sigma_l P'_l$. In one option, the values of $P_0$ and/or $P'_l$ are indicated by the UE in the CSI report. In another option, the values of $P_0$ and/or $P'_l$ are fixed in the NR specification. In another option, the values of $P_0$ and/or $P'_l$ are configured to the UE. When the selected vectors are identical for a subset of layers or all layers, a single indicator for each layer subset or all layers is used in the CSI report.

In accordance with embodiments, the basis vectors of the second basis set are grouped into B basis subsets, wherein each basis subset comprises a number of basis vectors, and the UE is configured to select $b_l$ basis subsets out of the B basis subsets for each layer for the precoding vector or matrix and to indicate the selected $b_l$ basis subsets in the CSI report using a first indicator. From the selected basis subsets, the UE is configured to select a number of basis vectors within each selected basis subset per layer or subset of layers or all layers and indicate the selected basis vectors in the CSI report using a second indicator.

In one option, the first indicator is given by a bitmap of size B bits, whereas the second indicator is given by a bitmap of size $b_l E$ bits. In another option, the first indicator is given by a bitmap of size B bits, whereas the second indicator is given by a combinatorial indicator of size $$\left\lceil \log_2 \binom{b_l E}{P'_l} \right\rceil.$$

In another option, the first indicator is given by a combinatorial indicator of size $$\left\lceil \log_2 \binom{B}{b_l} \right\rceil,$$

whereas the second indicator is given by a bitmap of size $b_l E$ bits. In another option, the first indicator is given by a combinatorial indicator of size $$\left\lceil \log_2 \binom{B}{b_l} \right\rceil,$$

whereas the second indicator is given by a combinatorial indicator of size $$\left\lceil \log_2 \binom{b_l E}{P'_l} \right\rceil.$$

In one example, the first indicator may be layer common and the second indicator may be layer specific. In another example, the first indicator may be layer common and the second indicator may also be layer specific. In another example, the first indicator may be layer common and the second indicator may be common for a subset of layers and different for different subsets of layers. In one example, the first indicator may be layer specific and the second indicator may be layer specific. In another example, the first indicator may be layer specific and the second indicator may also be layer common. In another example, the first indicator may be common for a subset of layers and different for different subsets of layers and the second indicator may be common for a subset of layers and different for different subsets of layers. In another example, the first indicator may be common for a subset of layers and different for different subsets of layers and the second indicator may be common for all layers. In another example, the first indicator may be common for a subset of layers and different for different subsets of layers and the second indicator may be layer specific. When an indicator (either first or second) is layer common, only one indicator for all RI layers is included in the CSI report. When an indicator (either first or second) is layer specific, one indicator for each layer is included in the CSI report. When an indicator (either first or second) is common for a subset of layers and different for different subsets of layers, then one indicator for each subset of layers in included in the CSI report.

Indication of Combining Coefficients in the CSI Report

In accordance with embodiments, the UE is configured to select a number of combining coefficients per layer used to combine the one or more vectors selected from the first and second basis sets and to indicate the selected combining coefficients in the CSI report.

In accordance with embodiments, the UE is configured with a maximum number, $K_0$, combining coefficients per layer of the precoding vector or matrix, and to select $K_1$ combining coefficients per layer and to indicate the selected $K_1$ combining coefficients in the CSI report, wherein $K_1 \leq K_0$.

In accordance with embodiments, the UE is configured with a maximum number, $\overline{K}_0$, combining coefficients per subset of layers or all layers, and to select $K_1$ combining coefficients per subset of layers or all layers, and to indicate the selected $K_1$ combining coefficients in the CSI report, wherein $K_1 \leq \overline{K}_0$.

In accordance with embodiments, $K_1 \leq \overline{K}_0$ and $K_1 \leq K_0$.

In accordance with embodiments, $\overline{K}_0 = 2K_0$.

In accordance with embodiments, the maximum number, $K_0$, or $\overline{K}_0$ of combining coefficients per layer, or subset of layers, or all layers of the precoding vector or matrix contained in a CSI report is defined by $K_0 = \alpha P$, or $K_0 = \alpha P'$, $\overline{K}_0 = \beta P$, or $\overline{K}_0 = \beta P'$, wherein $\alpha < 1$, $\beta < 1$ or $\alpha \in \{0.5, 0.75, 1, 1.25, 1.5, 2\}$ or $\beta \in \{0.5, 0.75, 1, 1.12, 1.5, 2\}$.

In accordance with embodiments, $K_0$ is smaller than a total of T coefficients.

In accordance with embodiments, the CSI report comprises $K_1$ combining coefficients out of a total of T coefficients per layer, subset of layers, or all layers, wherein $K_1 < T$ or $K_1 \leq T$.

In accordance with embodiments, the CSI report comprises an indication on the number of combining coefficients $K_1$ per layer, and/or across subset of layers, and/or across all layers.

In accordance with embodiments, the number of combining coefficients $K_1$ per layer, and/or across subset of layers, and/or across all layers is selected by the UE and indicated in the CSI report.

In accordance with embodiments, the number of combining coefficients $K_1$ per layer, and/or across subset of layers, and/or across all layers is configured to the UE, e.g., via a higher layer from a network node, or it is fixed in the NR specifications.

The parameter $K_1$ may be defined by a combination of parameters (e.g., T, $K_0$, and/or the RI value) or may depend on the number of CSI-RS ports, P, configured to the UE. For example, the number of non-zero coefficients per layer, subset of layers, or across all layers $K_1 = \gamma P$, where $\gamma < 1$ or $$\gamma \in \left\{\frac{1}{2}, \frac{3}{4}, 1, \frac{5}{4}, \frac{3}{2}, 2\right\}.$$

In another example, the parameter $K_1$ may depend on the total number of selected CSI-RS ports across all layers ($P'_t$). In another example, the parameter $K_1$ may depend on the maximum number of selected CSI-RS ports across all layers ($P_m$), where $P_m = \max(P'_l), \forall l$.

In one exemplary embodiment, parameter $K_1$ indicating the number of coefficients reported by the UE per layer, or a subset of layers, or for all layers is RI-common. This means, the parameter $K_1$ does not depend on the RI value of the precoding vector or matrix.

In one exemplary embodiment, the parameter $K_1$ indicating the number of coefficients reported by the UE per layer, or a subset of layers, or for all layers is RI-specific. This means, the parameter $K_1$ may depend on the RI value of the precoding vector or matrix. For example, for RI=1, the parameter $K_1$ is given by $K_1 = \lceil \beta P_e \rceil$, where $\beta < 1$ or $\beta \leq 1$ and for RI>1, the parameter $K_1$ is given by $K_1 = \lceil \beta P_e \rceil$, where $\beta < 1$ or $\beta \leq 1$ and $P_e = P$ or $P_e = P'_l$ or $P_e = P_m$.

In one exemplary embodiment, the CSI report comprises $K_1$ combining coefficients per layer, subset of layers, or all layers, selected from $K_0$ or $2K_0$ combining coefficients, wherein $K_1$ is either freely selected by the UE, wherein $K_1 \leq K_0$ and $K_0$ is smaller than a total of T coefficients or $K_1$ is configured to the UE.

In accordance with embodiments, the CSI report comprises a coefficient indicator indicating the selected combining coefficients out of a total of T coefficients per transmission layer of the precoding vector matrix.

In one exemplary embodiment, the coefficient indicator is a bitmap of size T wherein each bit in the bitmap is associated with a coefficient. When a bit in the bitmap is set to '1' the associated coefficient is contained in the CSI report and a bit in the bitmap is set to '0' the associated coefficient is not contained in the CSI report.

In one exemplary embodiment, the coefficient indicator is a bitmap of size T wherein each bit in the bitmap is associated with a selected basis vector from the first basis set and a basis vector from the second basis set. When a bit in the bitmap is set to '1' the associated coefficient is contained in the CSI report and a bit in the bitmap is set to '0' the associated coefficient is not contained in the CSI report.

In one exemplary embodiment, the coefficient indicator is a combinatorial bit indicator $$\left\lceil \log_2 \binom{T}{K_1} \right\rceil$$

indicating the selected $K_1$ combining coefficients out of a total of T combining coefficients.

In accordance with embodiments, T=PD, T=P'D, T=2P'D, T=$P'_l$D or T=$P_m$D per layer, or T=RI·PD, T=RI·P'D, T=P$_0$D, T=RI·$P_t$ D, T=RI·$P_m$ D or T=RI·2P'D per layer or for all layers or for a subset of layers.

In accordance with embodiments, when D=1, the coefficient selection indication (e.g., via a bitmap or a combinatorial indicator) is not included in the CSI report, whereas for D>1, the coefficient selection indication (e.g., via a bitmap or a combinatorial indicator) is included in the CSI report.

UCI Reporting

In accordance with embodiments, the UE is configured to feedback the CSI report as a part of the uplink control information (UCI) over an uplink channel, where an uplink channel can be the PUCCH, or der the PUSCH, or a combination thereof.

In accordance with embodiments, the CSI report comprises at least two parts, CSI part 1 and CSI part 2, wherein the first part, CSI part 1, has a fixed payload size and indicates the size of second part, CSI part 2.

In accordance with embodiments, the CSI part 1 comprises an indication of the total number of selected basis vectors (or port indices) from the second basis set per layer, subset of layers, or across all layers of the precoding vector or matrix.

In accordance with embodiments, the CSI part 1 comprises an indication of the maximum number of selected basis vectors (port indices) (P m) from the second basis set across a subset of layers or across all layers of the precoding vector or matrix.

Figure 4:
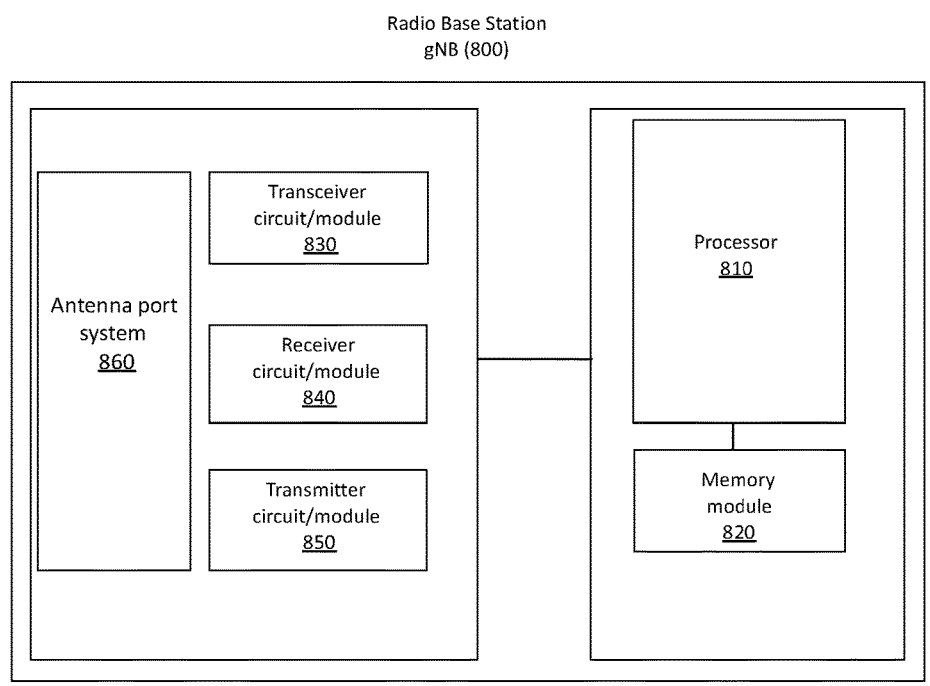
FIG. 4 is a schematic representation of a radio base station.

In order to perform the previously described process or method steps related to the radio network node (e.g. a radio base station or gNB), some embodiments herein include a network node for receiving feedback from a UE as previously described. As shown in FIG. 4, the network node or radio base station or gNB 800 comprises a processor 810 or processing circuit or a processing module or a processor or means 810; a receiver circuit or receiver module 840; a transmitter circuit or transmitter module 850; a memory module 820 a transceiver circuit or transceiver module 830 which may include the transmitter circuit 850 and the receiver circuit 840. The network node 800 further comprises an antenna system 860 which includes antenna circuitry for transmitting and receiving signals to/from at least the UE. The antenna system employs beamforming as previously described.

The network node 500 may belong to any radio access technology including 2G, 3G, 4G or LTE, LTE-A, 5G, WLAN, and WiMax etc. that support beamforming technology.

The processing module/circuit 810 includes a processor, microprocessor, an application specific integrated circuit (ASIC), field programmable gate array (FPGA), or the like, and may be referred to as the "processor 810." The processor 810 controls the operation of the network node 800 and its components. Memory (circuit or module) 820 includes a random access memory (RAM), a read only memory (ROM), and/or another type of memory to store data and instructions that may be used by processor 810. In general, it will be understood that the network node 800 in one or more embodiments includes fixed or programmed circuitry that is configured to carry out the operations in any of the embodiments disclosed herein.

In at least one such example, the network node 800 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including anyone of method steps already described. Further, it will be appreciated that the network node 800 may comprise additional components not shown in FIG. 4.

Details on the functions and operations performed by the network node have already been described and need not be repeated again.

In order to perform the previously described process or method steps related to the UE or communication device or radio device, some embodiments herein include a UE for providing efficient feedback reporting for at least a New Radio- (NR) based wireless communication network system, which feedback includes Channel State Information (CSI).

Figure 5:
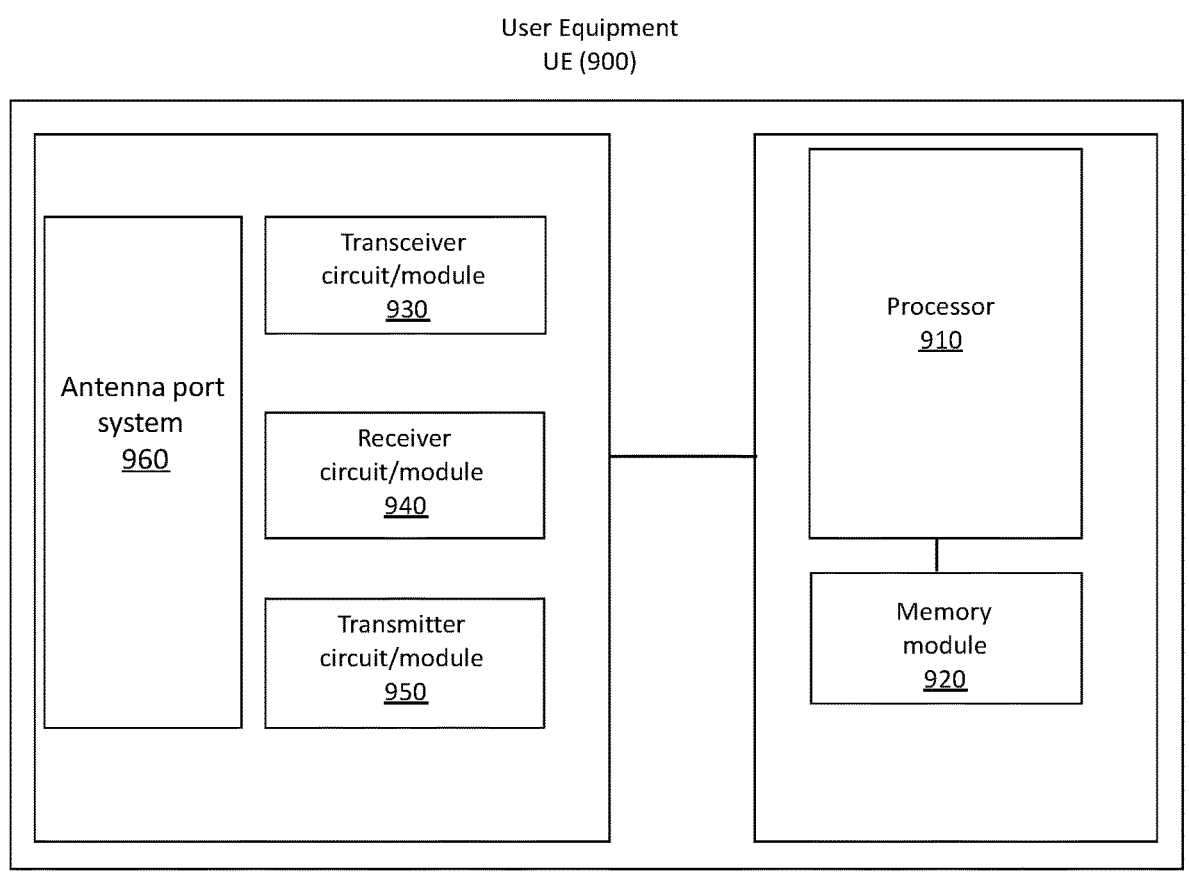
FIG. 5 is a schematic representation of a user equipment.

As shown in FIG. 5, the UE 900 comprises a processor 910 or processing circuit or a processing module or a processor or means 910; a receiver circuit or receiver module 940; a transmitter circuit or transmitter module 950; a memory module 920 a transceiver circuit or transceiver module 930 which may include the transmitter circuit 950 and the receiver circuit 940. The UE 900 further comprises an antenna system 960 which includes antenna circuitry for transmitting and receiving signals to/from at least the UE. The antenna system employs beamforming as previously described.

The network node 500 may belong to any radio access technology including 2G, 3G, 4G or LTE, LTE-A, 5G, WLAN, and WiMax etc. that support beamforming technology.

The processing module/circuit 910 includes a processor, microprocessor, an application specific integrated circuit (ASIC), field programmable gate array (FPGA), or the like, and may be referred to as the "processor 910." The processor 910 controls the operation of the network node 900 and its components. Memory (circuit or module) 920 includes a random access memory (RAM), a read only memory (ROM), and/or another type of memory to store data and instructions that may be used by processor 910. In general, it will be understood that the UE 900 in one or more embodiments includes fixed or programmed circuitry that is configured to carry out the operations in any of the embodiments disclosed herein.

In at least one such example, the UE 900 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including anyone of method steps already described. Further, it will be appreciated that the UE 900 may comprise additional components not shown in FIG. 5.

Details on the functions and operations performed by the UE have already been described and need not be repeated.

It will be understood that the invention is not restricted to the aforedescribed and illustrated exemplifying embodiments thereof and that modifications can be made within the scope of the inventive concept as defined by the accompanying Claims.

The invention claimed is:

1. A method performed by a user equipment (UE) for generating a channel state information (CSI) report in a wireless communication system, the method comprising:
   receiving from a network node, a CSI report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D < N_3$, and $N_3$ is a number of subbands;
   identifying a precoding vector or matrix for each transmission layer based on the first basis set, a second basis set comprising P basis vectors, and a number of combining coefficients for combining selected vectors from the first and second basis sets;
   generating a CSI report based on the CSI report configuration information for a rank indication value (RI) or v of the rank set, wherein the CSI report comprises for each transmission layer or subsets of transmission layers or all transmission layers an indication of a subset of P' selected basis vectors from the second basis set, wherein $P' < P$ or $P' \leq P$, and for each of the P' basis vectors an indication of $D' < D$ or $D' \leq D$ selected basis vectors from the first basis set, wherein a maximum number, $K_0$, of combining coefficients per layer, or subset of layers, or all layers of the precoding vector or matrix contained in the CSI report is defined by $K_0 = \alpha P$, wherein $\alpha < 1$ or a $\alpha \in \{0.5, 0.75, 1, 1.25, 1.5, 2\}$; and
   transmitting the CSI report to the network node.

2. The method according to claim 1, wherein the CSI report comprises $K_1$ combining coefficients per layer, wherein $K_1$ is selected from $K_0$ combining coefficients, and wherein $K_1$ is reported by the UE.

3. The method according to claim 1, wherein the CSI report comprises $K_1$ combining coefficients across all layers, wherein $K_1$ is selected from $2K_0$ combining coefficients, and wherein $K_1$ is reported by the UE.

4. The method according to claim 1, wherein the number of selected basis vectors, $P_l'$, from the second basis set per transmission layer satisfies a sum constraint across all RI transmission layers, wherein the total number of basis vectors selected from the second basis set across all layers is smaller or equal than a value, R, with R being a positive integer.

5. The method according to claim 1, wherein the CSI report comprises at least two parts, CSI part 1 and CSI part 2, wherein the first part, CSI part 1, has a fixed payload size and indicates the size of second part, CSI part 2, and CSI part 1 comprises an indication of the total number of selected basis vectors from the second basis set across all layers of the precoding vector or matrix.

6. The method according to claim 5, wherein the UE is configured to determine a common basis set comprising at least the selected basis vectors from the second basis set across all RI transmission layers, and to indicate the basis vectors of the common basis set and the basis vectors selected from the common basis set for each transmission layer of the precoding vector or matrix in the CSI report.

7. The method according to claim 5, wherein the basis vectors of the second basis set are grouped into B basis subsets, wherein each basis subset comprises a number of basis vectors, and the UE is configured to select $b_l$ basis subsets out of the B basis subsets per layer for the precoding vector or matrix and to indicate the selected $b_l$ basis subsets in the CSI report.

8. The method according to claim 1, wherein the UE is configured to determine a common basis set comprising at least the selected basis vectors from the second basis set across all RI transmission layers, and to indicate the basis vectors of the common basis set and the basis vectors selected from the common basis set for each transmission layer of the precoding vector or matrix in the CSI report.

9. The method according to claim 1, wherein the basis vectors of the second basis set are grouped into B basis subsets, wherein each basis subset comprises a number of basis vectors, and the UE is configured to select $b_l$ basis subsets out of the B basis subsets per layer for the precoding vector or matrix and to indicate the selected $b_l$ basis subsets in the CSI report.

10. The method according to claim 9, wherein the UE is configured to select a number of basis vectors per layer within each selected basis subset and to indicate the selected basis vectors in the CSI report.

11. A method performed by a network node for receiving a channel state information (CSI) report generated by a user equipment (UE) in a wireless communication system, the method comprising:
   sending, to the UE, CSI report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D < N_3$, and $N_3$ is a number of subbands; and
   receiving the CSI report from the UE, wherein the CSI report is based on the CSI report configuration information for a rank indication, value, RI, or v of the rank set, and wherein the CSI report comprises for each transmission layer or subsets of transmission layers or all transmission layers an indication of a subset of P' selected basis vectors from the second basis set, wherein $P' < P$ or $P' \leq P$, and for each of the P' basis vectors an indication of $D' < D$ or $D' \leq D$ selected basis vectors from the first basis set,
   wherein a maximum number, $K_0$, of combining coefficients per layer, or subset of layers, or all layers of the precoding vector or matrix contained in the CSI report is defined by $K_0 = \alpha P$, wherein $\alpha < 1$ or $\alpha \in \{0.5, 0.75, 1, 1.25, 1.5, 2\}$.

12. A user equipment (UE) in a wireless communication system adapted to generate a channel state information (CSI) report, the UE being enabled to:
   receive from a network node, like a base station, CSI report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D < N_3$, and $N_3$ is a number of subbands;
   identify a precoding vector or matrix for each transmission layer based on the first basis set, a second basis set comprising P basis vectors, and a number of combining coefficients for combining selected vectors from the first and second basis sets;
   generate a CSI report based on the CSI report configuration information for a rank value RI or v of the rank set, wherein the CSI report comprises for each transmission layer or subsets of transmission layers or all transmission layers an indication of a subset of P' selected basis vectors from the second basis set, wherein $P' < P$ or $P' \leq P$, and for each of the P' basis vectors an indication of D'<D or D'≤D selected basis vectors from the first basis set, wherein a maximum number, $K_0$, of combining coefficients per layer, or subset of layers, or all layers of the precoding vector or matrix contained in the CSI report is defined by $K_0=\alpha P$, wherein $\alpha<1$ or $\alpha \in \{0.5, 0.75, 1, 1.25, 1.5, 2\}$; and transmit the CSI report to the network node.

13. A User Equipment (UE) comprising a processor and a memory, said memory containing instructions executable by said processor whereby said UE is operative to:

receive from a network node, a channel state information (CSI) report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D<N_3$, and $N_3$ is a number of subbands;

identify a precoding vector or matrix for each transmission layer based on the first basis set, a second basis set comprising P basis vectors, and a number of combining coefficients for combining selected vectors from the first and second basis sets;

generate a CSI report based on the CSI report configuration information for a rank indication value (RI) or v of the rank set, wherein the CSI report comprises for each transmission layer or subsets of transmission layers or all transmission layers an indication of a subset of P' selected basis vectors from the second basis set, wherein P'<P or P'≤P, and for each of the P' basis vectors an indication of D'<D or D'≤D selected basis vectors from the first basis set, wherein a maximum number, $K_0$, of combining coefficients per layer, or subset of layers, or all layers of the precoding vector or matrix contained in the CSI report is defined by $K_0=\alpha P$, wherein $\alpha<1$ or $\alpha \in \{0.5, 0.75, 1, 1.25, 1.5, 2\}$; and transmit the CSI report to the network node.

14. A network node comprising a processor and a memory, said memory containing instructions executable by said processor whereby said network node is operative to:

send, to the user equipment (UE), channel state information (CSI) report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D<N_3$, and $N_3$ is a number of subbands; and receive the CSI report from the UE, wherein the CSI report is based on the CSI report configuration information for a rank indication, value, RI, or v of the rank set, and wherein the CSI report comprises for each transmission layer or subsets of transmission layers or all transmission layers an indication of a subset of P' selected basis vectors from the second basis set, wherein P'<P or P'≤P, and for each of the P' basis vectors an indication of D'<D or D'≤D selected basis vectors from the first basis set, wherein a maximum number, $K_0$, of combining coefficients per layer, or subset of layers, or all layers of the precoding vector or matrix contained in the CSI report is defined by $K_0=\alpha P$, wherein $\alpha<1$ or $\alpha \in \{0.5, 0.75, 1, 1.25, 1.5, 2\}$.

15. A non-transitory computer-readable medium having stored thereon computer program instructions, which, when executed by a computer of a user equipment (UE) for generating a channel state information (CSI) report in a wireless communication system, cause the computer to:

receive from a network node, a CSI report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D<N_3$, and $N_3$ is a number of subbands;

identify a precoding vector or matrix for each transmission layer based on the first basis set, a second basis set comprising P basis vectors, and a number of combining coefficients for combining selected vectors from the first and second basis sets;

generate a CSI report based on the CSI report configuration information for a rank indication value (RI) or v of the rank set, wherein the CSI report comprises for each transmission layer or subsets of transmission layers or all transmission layers an indication of a subset of P' selected basis vectors from the second basis set, wherein P'<P or P'≤P, and for each of the P' basis vectors an indication of D'<D or D'≤D selected basis vectors from the first basis set, wherein a maximum number, $K_0$, of combining coefficients per layer, or subset of layers, or all layers of the precoding vector or matrix contained in the CSI report is defined by $K_0=\alpha P$, wherein $\alpha<1$ or a $\alpha \in \{0.5, 0.75, 1, 1.25, 1.5, 2\}$; and transmit the CSI report to the network node.

16. A non-transitory computer-readable medium having stored thereon computer program instructions, which, when executed by a computer of a network node for receiving a channel state information (CSI) report generated by a user equipment (UE) in a wireless communication system, cause the computer to:

send, to the UE, CSI report configuration information including at least one parameter, D, for indicating a first basis set of D basis vectors used for constructing for each transmission layer a precoding vector or matrix for a rank set, wherein the first basis set is a subset of a basis set comprising $N_3$ basis vectors, each vector of size $N_3 \times 1$, wherein $D<N_3$, and $N_3$ is a number of subbands; and receive the CSI report from the UE, wherein the CSI report is based on the CSI report configuration information for a rank indication, value, RI, or v of the rank set, and wherein the CSI report comprises for each transmission layer or subsets of transmission layers or all transmission layers an indication of a subset of P' selected basis vectors from the second basis set, wherein P'<P or P'≤P, and for each of the P' basis vectors an indication of D'<D or D'≤D selected basis vectors from the first basis set, wherein a maximum number, $K_0$, of combining coefficients per layer, or subset of layers, or all layers of the precoding vector or matrix contained in the CSI report is defined by $K_0=\alpha P$, wherein $\alpha<1$ or $\alpha \in \{0.5, 0.75, 1, 1.25, 1.5, 2\}$.

* * * * *